United States Patent
Pathak et al.

(10) Patent No.: US 11,917,421 B2
(45) Date of Patent: Feb. 27, 2024

(54) CARRIER AGGREGATION CONFIGURATION IN FIFTH GENERATION (5G) NETWORKS OR OTHER NEXT GENERATION NETWORKS

(71) Applicant: AT&T Mobility II LLC, Atlanta, GA (US)

(72) Inventors: Shomik Pathak, Richardson, TX (US); Cecilia N. Nguyen, Hickory Creek, TX (US); Harry Liu, Hudson, OH (US); James P. Daves, Acworth, GA (US); William D. Turczyn, Clinton, NY (US); Yang Wang, Naperville, IL (US); Mark Butler, Arlington Heights, IL (US); Murari Lamsal, Charlotte, NC (US); Jason E. Carter, Gardendale, AL (US); Iftekhar Alam, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 278 days.

(21) Appl. No.: 17/186,290

(22) Filed: Feb. 26, 2021

(65) Prior Publication Data
US 2022/0264571 A1    Aug. 18, 2022

Related U.S. Application Data

(60) Provisional application No. 63/150,175, filed on Feb. 17, 2021, provisional application No. 63/150,181, (Continued)

(51) Int. Cl.
*H04W 16/22* (2009.01)
*H01Q 1/24* (2006.01)
(Continued)

(52) U.S. Cl.
CPC .......... *H04W 16/22* (2013.01); *H01Q 1/246* (2013.01); *H01Q 3/34* (2013.01); *H01Q 21/28* (2013.01);
(Continued)

(58) Field of Classification Search
None
See application file for complete search history.

(56) References Cited

U.S. PATENT DOCUMENTS

2014/0080509 A1    3/2014  Siomina et al.
2016/0302203 A1*  10/2016  Liu ..................... H04L 5/0098
(Continued)

OTHER PUBLICATIONS

Office Action dated Jul. 5, 2022 for U.S. Appl. No. 17/186,291, 27 pages.
(Continued)

*Primary Examiner* — Srinivasa R Reddivalam
(74) *Attorney, Agent, or Firm* — Guntin & Gust, PLC; Ralph Trementozzi

(57) ABSTRACT

The technologies described herein are generally directed to configuring carrier aggregation zones based on transmission information in a fifth generation (5G) network or other next generation networks. For example, a method described herein can include identifying, by carrier aggregation equipment including a processor, carrier transmission information corresponding to a first carrier signal and a second carrier signal. The method can further include analyzing, by the carrier aggregation equipment, the carrier transmission information to determine first overlap zone information representative of a first carrier overlap zone for the first carrier signal and the second carrier signal. Further, based on the first overlap zone information, the method includes facilitating configuring transmission parameter information representative of a transmission parameter applicable to
(Continued)

transmission of the first carrier signal, to enable carrier aggregation by network equipment within the first carrier overlap zone.

20 Claims, 14 Drawing Sheets

Related U.S. Application Data filed on Feb. 17, 2021, provisional application No. 63/150,178, filed on Feb. 17, 2021.

(51) Int. Cl.
| | |
|---|---|
| *H01Q 3/34* | (2006.01) |
| *H01Q 21/28* | (2006.01) |
| *H04B 7/0426* | (2017.01) |
| *H04B 17/00* | (2015.01) |
| *H04B 17/309* | (2015.01) |
| *H04B 17/391* | (2015.01) |
| *H04L 5/00* | (2006.01) |
| *H04W 16/02* | (2009.01) |
| *H04W 16/28* | (2009.01) |
| *H04W 72/04* | (2023.01) |
| *H04W 72/0453* | (2023.01) |
| *H04W 72/12* | (2023.01) |
| *H04W 72/51* | (2023.01) |

(52) U.S. Cl.
CPC ......... *H04B 7/043* (2013.01); *H04B 17/0087* (2013.01); *H04B 17/309* (2015.01); *H04B 17/3912* (2015.01); *H04L 5/001* (2013.01); *H04W 16/02* (2013.01); *H04W 16/28* (2013.01); *H04W 72/04* (2013.01); *H04W 72/0453* (2013.01); *H04W 72/12* (2013.01); *H04W 72/51* (2023.01)

(56) References Cited

U.S. PATENT DOCUMENTS

| | | |
|---|---|---|
| 2018/0077696 A1 | 3/2018 | Lee et al. |
| 2018/0242179 A1* | 8/2018 | Rathonyi .............. H04W 24/08 |
| 2018/0310311 A1* | 10/2018 | Li ......................... H04L 5/0051 |
| 2019/0191466 A1 | 6/2019 | Xu |
| 2019/0254013 A1 | 8/2019 | Chang et al. |
| 2021/0144715 A1* | 5/2021 | Gotoh .................. H04L 1/0004 |
| 2022/0109498 A1 | 4/2022 | Vaez-Ghaemi et al. |

OTHER PUBLICATIONS

Office Action dated Jan. 13, 2023 for U.S. Appl. No. 17/186,286, 21 pages.

* cited by examiner

CARRIER AGGREGATION CONFIGURATION IN FIFTH GENERATION (5G) NETWORKS OR OTHER NEXT GENERATION NETWORKS

CROSS-REFERENCE TO RELATED APPLICATIONS

This non-provisional application claims priority to each of U.S. Provisional Patent Application No. 63/150,175, filed on Feb. 17, 2021, and entitled "LAUNCHING RADIO SPECTRUM RESOURCES INTO A FIFTH GENERATION (5G) NETWORK OR OTHER NEXT GENERATION NETWORKS," U.S. Provisional Patent Application No. 63/150,178, filed on Feb. 17, 2021, and entitled "CARRIER AGGREGATION CONFIGURATION IN FIFTH GENERATION (5G) NETWORKS OR OTHER NEXT GENERATION NETWORKS," and U.S. Provisional Patent Application No. 63/150,181, filed on Feb. 17, 2021, and entitled "ALLOCATING RESOURCES TO INTERNET OF THINGS EQUIPMENT IN A FIFTH GENERATION (5G) NETWORK OR OTHER NEXT GENERATION NETWORKS." The respective entireties of the aforementioned provisional applications are hereby incorporated by reference herein.

TECHNICAL FIELD

The subject application is related to implementation of fifth generation (5G) wireless communication systems or other next generation wireless communication systems, and, for example, different approaches to carrier signal aggregation.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
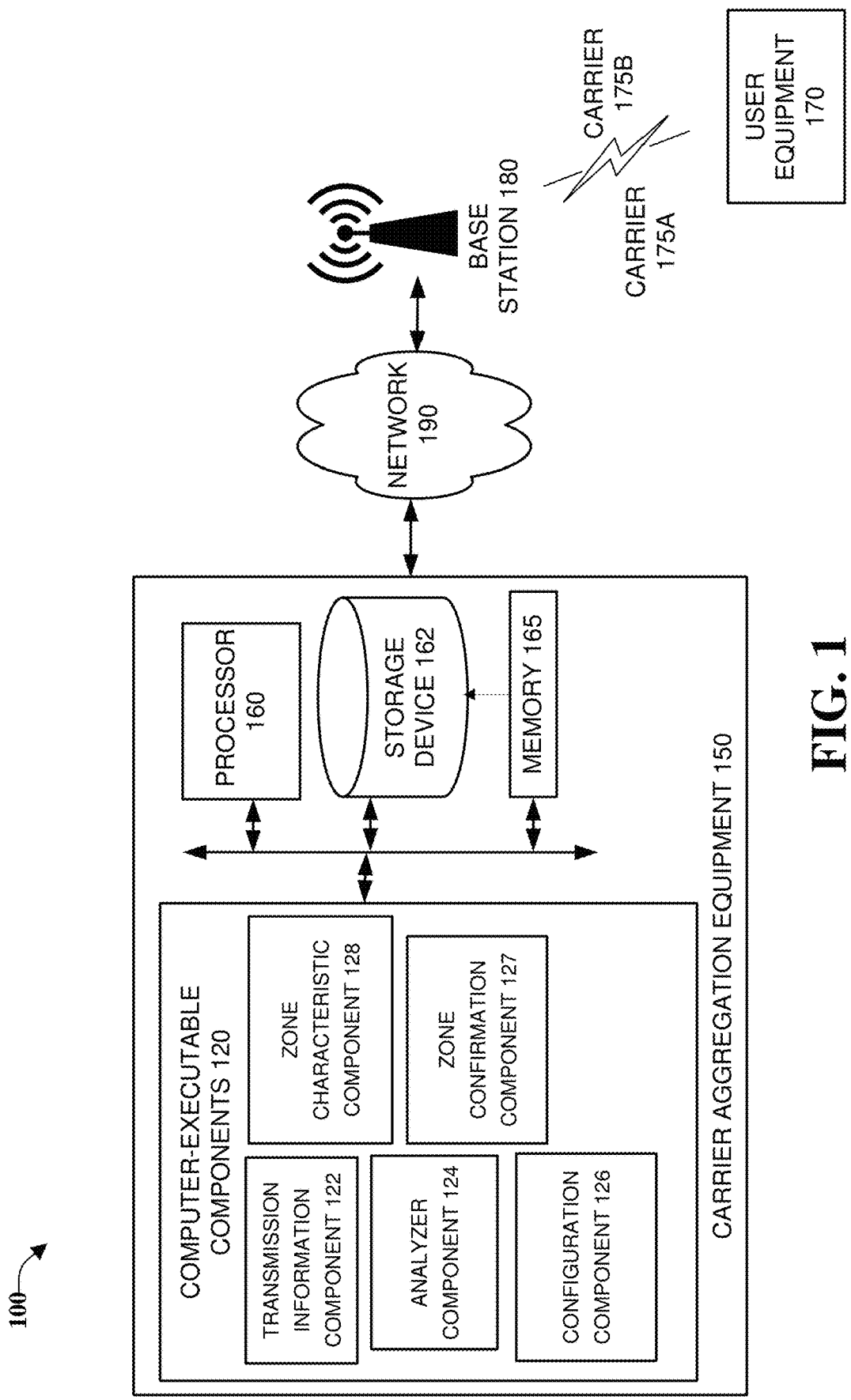
FIG. 1 is an architecture diagram of an example system that can facilitate configuring carrier aggregation zones based on transmission information, in accordance with one or more embodiments.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate configuring carrier aggregation zones based on transmission information.

Different examples that describe these aspects are included with the description of FIGS. 1-10 below. It should be noted that the subject disclosure may be embodied in many different forms and should not be construed as limited to this example or other examples set forth herein. For example, one or more examples discussed herein concern environments where carrier signals can overlap in particular geographic locations, and in some circumstances, these locations can be enabled as carrier aggregation zones for capable user equipment. One or more embodiments described herein provide different approaches for setting up, configuring, and maintaining these carrier aggregation zone.

Generally speaking, one or more embodiments can facilitate configuring carrier aggregation zones based on transmission information. In addition, one or more embodiments described herein can be directed towards a multi-connectivity framework that supports the operation of new radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

Networks that can be facilitated by one or more implementations described herein can include a wireless communication system, and thus can include one or more communication service provider networks that facilitate providing wireless communication services to various user equipments included in the one or more communication service provider networks. The one or more communication service provider networks can include various types of disparate networks, including but not limited to: cellular networks, femto networks, picocell networks, microcell networks, internet protocol (IP) networks, Wi-Fi service networks, broadband service networks, enterprise networks, cloud-based networks, and the like.

For example, in at least one implementation, system 100 can be used to facilitate the implementation of parts of a large-scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.). One or more embodiments can facilitate the placement of multiple antennas in a geographic area enabling coverage by networks that include, but are not limited to, communication service provider networks. In exemplary, non-limiting embodiments described herein, simulated groups of antennas can include millimeter wave (mmWave) antennas of a base station of a cellular network, e.g., a fifth generation or other next generation RAN. In certain implementations of types of mmWave antennas, large numbers of antennas are deployed in comparison with the number of other types of antennas that can be employed, e.g., up to and exceeding in some circumstances, one hundred antennas per square mile.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., identifying carrier signal overlap zones from antenna direction and signal characteristics for multiple signals), that are not abstract and cannot be performed as a set of mental acts by a human. For example, a human, or even a plurality of humans, cannot efficiently configure and maintain the configurations required to facilitate carrier aggregation zones at the same level of optimization, accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate configuring carrier aggregation zones based on transmission information. It should be noted that the subject disclosure may be embodied in many different forms and should not be construed as limited to this example or other examples set forth herein.

The above-described background relating to network hardware is merely intended to provide a contextual overview of some current issues, and is not intended to be exhaustive. Other contextual information may become further apparent upon review of the following detailed description.

FIG. 1 is an architecture diagram of an example system 100 that can facilitate configuring carrier aggregation zones based on transmission information, in accordance with one or more embodiments. For purposes of brevity, description of like elements and/or processes employed in other embodiments is omitted.

As depicted, system 100 can include carrier aggregation equipment 150 communicatively coupled to base station 180 via network 190. In one or more embodiments, carrier aggregation equipment 150 can include computer executable components 120, processor 160, storage device 162, and memory 165. It should be noted that, although many examples herein discuss carrier aggregation via user equipment 170, one having skill in the relevant art(s), given the description herein would appreciate that the approaches can also apply to any network device that is capable of receiving multiple communication signals.

Computer executable components 120 can include transmission information component 122, analyzer component 124, configuration component 126, zone characteristic component 128, zone confirmation component 127, and other components described or suggested by different embodiments described herein that can facilitate or improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, carrier aggregation equipment 150 can further comprise various computer and/or computing-based elements described herein with reference to operating environment 1000 and FIG. 10.

According to multiple embodiments, network 190 can comprise, but are not limited to, wired (including optical) and wireless networks, including, but not limited to, a cellular network, a wide area network (WAN) (e.g., the Internet) or a local area network (LAN). For example, system 100 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE) or 5G, third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1406 and FIG. 14. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1204 of FIG. 12. Such examples of processor 160 can be employed to implement any embodiments of the subject disclosure.

According to multiple embodiments, carrier aggregation equipment 150 can include memory 165 that can store one or more computer and/or machine readable, writable, and/or executable components and/or instructions 120 that, when respectively executed by processor 160, can facilitate performance of operations defined by the executable component(s) and/or instruction(s).

Generally, applications (e.g., computer-executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, handheld computing devices, microprocessor-based or programmable consumer electronics, and the like, each of which can be operatively coupled to one or more associated devices.

It should be appreciated that the embodiments of the subject disclosure depicted in various figures disclosed herein are for illustration only, and as such, the architecture of such embodiments are not limited to the systems, devices, and/or components depicted therein. For example, in some embodiments, carrier aggregation equipment 150 can further comprise various computer and/or computing-based elements described herein with reference to operating environment 1400 and FIG. 14. In one or more embodiments, such computer and/or computing-based elements can be used in connection with implementing one or more of the systems, devices, components, and/or computer-implemented operations shown and described in connection with FIG. 1 or other figures disclosed herein.

For example, in one or more embodiments, computer executable components 120 can be used in connection with implementing one or more of the systems, devices, components, and/or computer-implemented operations shown and described in connection with carrier aggregation equipment 150 of FIG. 1 or other figures disclosed herein. For example, in one or more embodiments, computer executable components 120 can include instructions that, when executed by processor 160, can facilitate performance of operations defining transmission information component 122. As discussed with FIGS. 3, 5, and 6 below, transmission information component 122 can, in accordance with one or more embodiments, identify carrier transmission information corresponding to a first carrier signal (e.g., carrier 175A) and the second carrier signal (e.g., carrier 175B).

In another example, in one or more embodiments, computer executable components 120 can further include instructions that, when executed by processor 160, can facilitate performance of operations defining analyzer component 124. As discussed with FIGS. 3, 5, and 6 below, analyzer component 124 can, in accordance with one or more embodiments, analyze the carrier transmission information to determine first overlap zone information representative of a first carrier overlap zone for the first carrier signal and the second carrier signal.

In another example, in one or more embodiments, computer executable components 120 can additionally include instructions that, when executed by processor 160, can facilitate performance of operations defining configuration component 126. As discussed with FIGS. 3, 5, and 6 below, configuration component 126 can, in accordance with one or more embodiments, based on the first overlap zone information, facilitate configuring transmission parameter information, representative of a transmission parameter applicable to transmission of the first carrier signal, to enable carrier aggregation by network equipment within the first carrier overlap zone.

It should be noted that, in one or more embodiments, system 100 and other embodiments described herein can employ hardware and/or software to solve problems that are highly technical in nature, including improving the operation of base station equipment and user equipment. One having skill in the relevant art(s), given the disclosure herein, would appreciate that the technical problems that can be solved by one or more embodiments described herein are not abstract and cannot be performed as a set of mental acts by a human.

Further, in certain embodiments, some of the processes performed can be performed by one or more specialized computers (e.g., one or more specialized processing units, a specialized computer such as tomography and reconstruction, statistical estimation, specialized routing analysis, and so on) for carrying out defined tasks related to identifying and configuring transmission of multiple carrier signals for use by user equipment 170 for carrier signal aggregation. System 100 and/or components of the system can be employed to solve new problems that arise through advancements in technologies mentioned above, computer architecture, and/or the like.

The above-described background relating to network hardware is merely intended to provide a contextual overview of some current issues, and is not intended to be exhaustive. Other contextual information may become further apparent upon review of the following detailed description.

Figure 2:
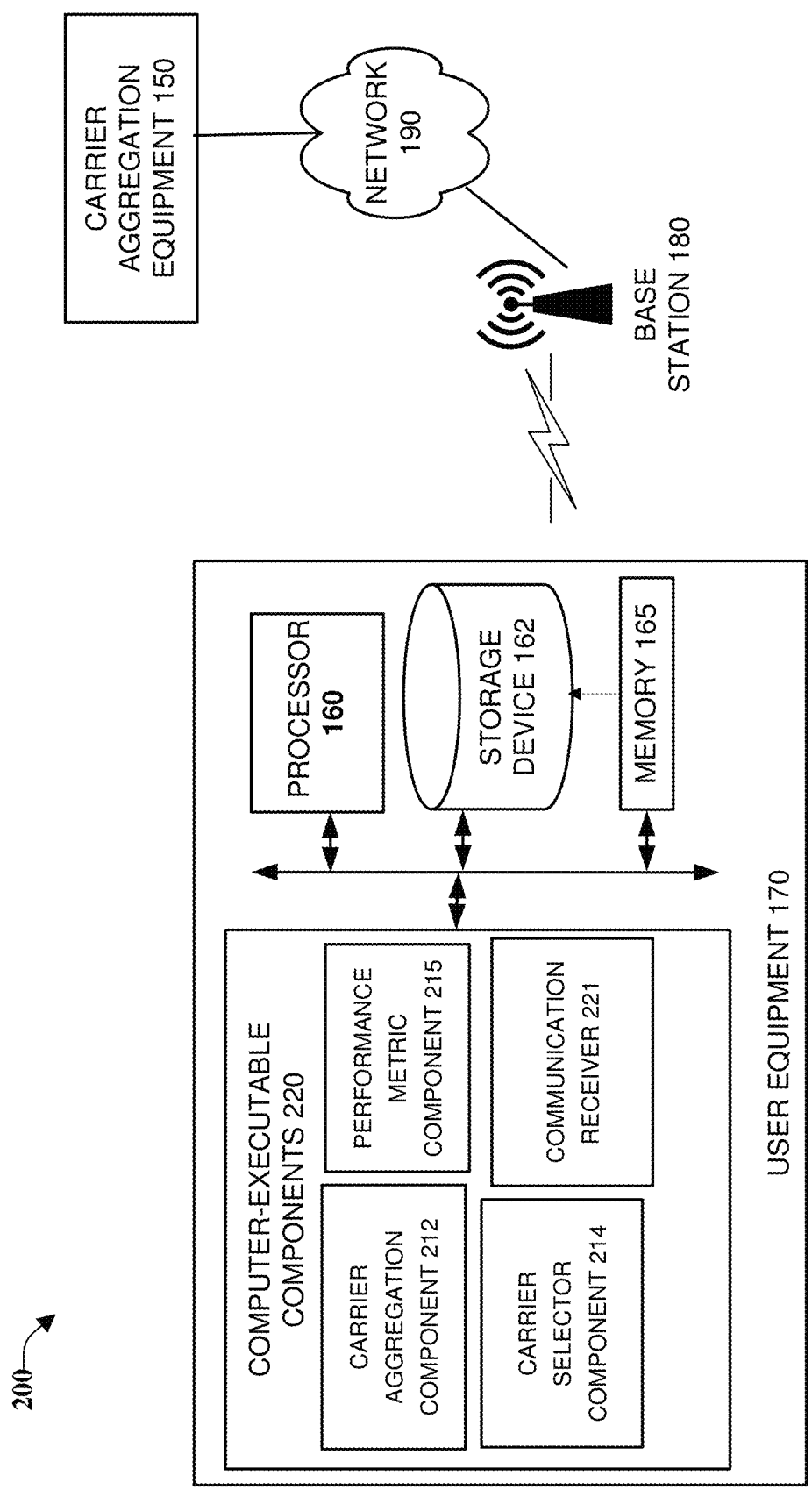
FIG. 2 is a diagram of a non-limiting example system that can facilitate configuring carrier aggregation zones based on transmission information provided on an ongoing basis by user equipment, in accordance with one or more embodiments.

FIG. 2 is a diagram of a non-limiting example system 200 that can facilitate configuring carrier aggregation zones based on transmission information provided on an ongoing basis by user equipment, in accordance with one or more embodiments. For purposes of brevity, description of like elements and/or processes employed in other embodiments is omitted.

As depicted, system 200 can include user equipment 170 connected to carrier aggregation equipment 150 via base station 180 and network 190. User equipment 170 can include memory 165 that can store one or more computer and/or machine readable, writable, and/or executable components and/or instructions 220 that, when respectively executed by processor 160, can facilitate performance of operations defined by the executable component(s) and/or instruction(s).

Generally, applications (e.g., computer-executable components 120) can include routines, programs, components, data structures, etc., that perform particular tasks or implement particular abstract data types. In system 200, computer executable components 220 can include carrier aggregation component 212, performance metric component 215, communication receiver 221, and other components described or suggested by different embodiments described herein that can improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, user equipment 170 can further comprise various computer and/or computing-based elements described herein with reference to mobile handset 1300 of FIG. 13 and operating environment 1400 described with FIG. 14.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 160, can facilitate performance of operations defining carrier aggregation component 212. As discussed with FIGS. 3, 5, and 6 below, carrier aggregation component 212 can, in accordance with one or more embodiments, receive (e.g., by communication receiver 221, from configuration component 126 of carrier aggregation equipment 150), as a result of an analysis of carrier transmission data corresponding to a first carrier signal and a second carrier signal (e.g., by configuration component 126), first carrier overlap zone data representing a first carrier overlap zone associated with the first carrier signal (e.g., carrier 175A) and the second carrier signal (e.g., carrier 175B). In addition, carrier aggregation component 212 can further, in response to receiving the first carrier overlap zone data, be configured to operate within the first carrier overlap zone.

In another example, in one or more embodiments, computer executable components 220 can include instructions that, when executed by processor 160, can facilitate performance of operations defining, carrier selector component 214. As discussed with FIGS. 3, 5, and 6 below, carrier selector component 214 can, in accordance with one or more embodiments, send a communication to the network equipment for aggregating a first carrier signal and a second carrier signal, with the first carrier signal being configured to enable the aggregating by the network equipment based on a configuration performed by the configuration equipment.

Figure 3:
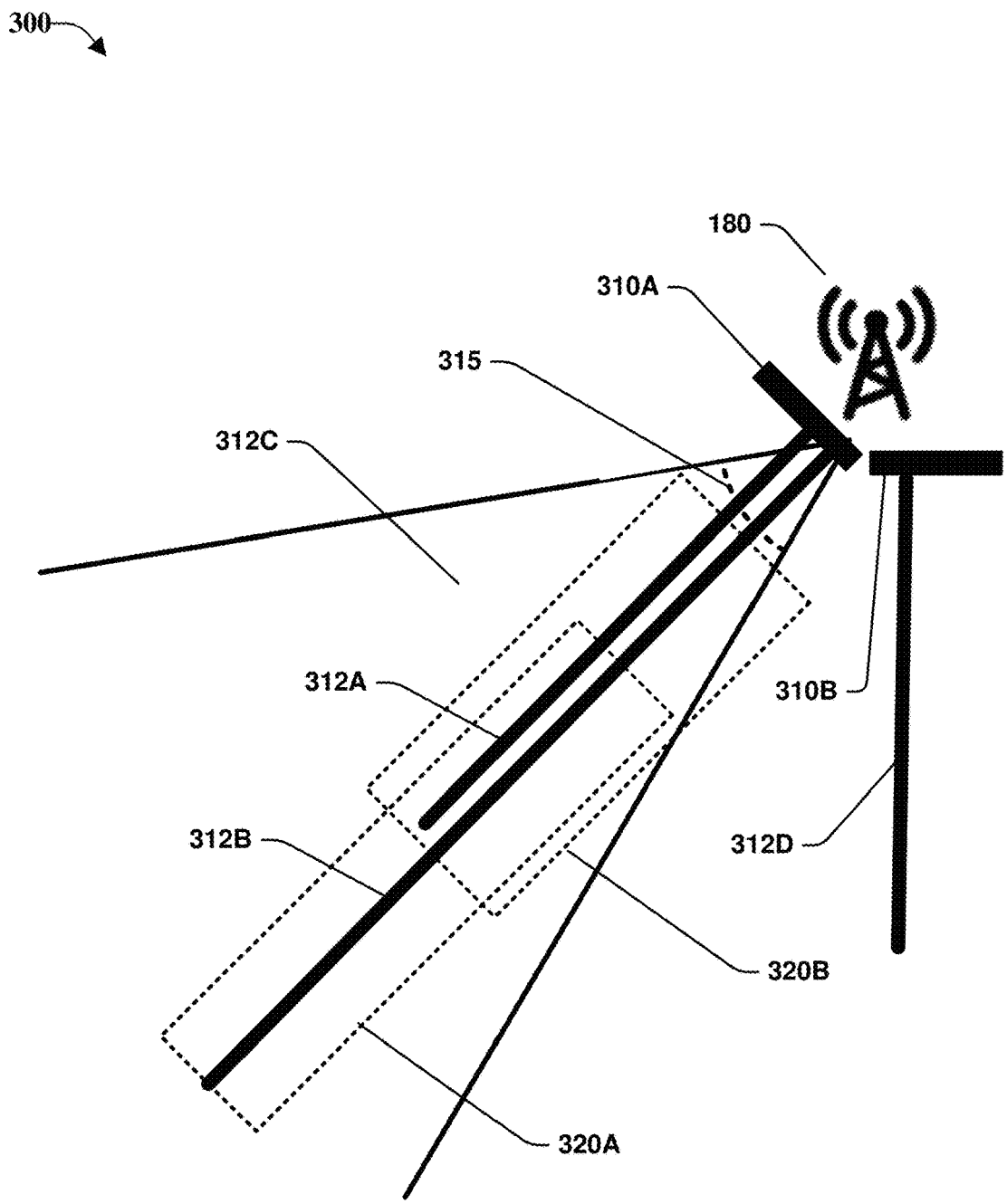
FIG. 3 is a diagram of a non-limiting example system that can facilitate configuring carrier aggregation zones based on transmission information, in accordance with one or more embodiments.

FIG. 3 is a diagram of a non-limiting example system 300 that can facilitate configuring carrier aggregation zones based on transmission information, in accordance with one or more embodiments. For purposes of brevity, description of like elements and/or processes employed in other embodiments is omitted.

As depicted, system 300 includes base station 180 with faces 310A-B. Faces 310A-B are depicted as sources of carrier signals 312A-C and 312D respectively. Carrier signal 312C is depicted as originating from face 310A with beam width 315. Based on the carrier signals 312A-C, carrier overlap zones 320A-B are identified.

It should be noted that, as used herein, antenna array faces (also termed faces, array faces) can refer to a surface of an antenna from which a signal beam (e.g., carrier signals 312A-C) can emit in a direction that is aimed by the antenna face. While this term can be associated with beams from any type of antenna, e.g., from narrow beam picocell antennas to macrocell wider beam antennas, the older, wider beam antennas were less susceptible to the precise aiming used to direct pencil-beam antennas used extensively in 5G network implementations. One or more embodiments can utilize analysis of the newly installed antenna arrays, with precisely directed beam coverage to more efficiently allocate wireless resources from the broad variety of installed equipment.

Generally speaking, one or more embodiments can analyze carrier transmission data to determine the predicted placement of carrier signals 312A-C. This information can be measured based on the operation of base station 180, but can also be predicted based on applying rules of physics and wireless signal propagation to the configuration of the transmission resources of base station 180, e.g., transmission information described below, used potentially as initial configuration information for setting up or maintaining the transmission resource of base station 180.

It should be noted that, with respect to the description of base station faces 310A-B described herein, this term can describe the direction of propagation of generated signals, e.g., face 310A depicted as originating carrier signals 312A-C, and face 310B depicted as originating carrier signal 312D in a different direction. Of note is that, by evaluating the coverage all the carrier signals 312A-C that originate from face 310A, one or more embodiments can identify and evaluate potentially useful opportunities (e.g., carrier overlap zones 320A-B) for the aggregation of different types of carrier signals, e.g., picocell carrier signals 312A-B and macrocell carrier signal 312C.

This phase that identifies carrier overlap zones 320A-B from existing signals can be termed in some embodiments a preparation phase, with the identification of transmission information from a variety of sources, e.g., comma separated values (CSV) files exported from existing software site design and audit tools. It should be noted that, while many of the examples described herein are directed to existing transmission faces, these examples are non-limiting, and one having skill in the relevant art(s), given the description herein would appreciate that instead of identifying carrier overlap zones from exiting faces, other embodiment can start with intended overlap zones and transmission information about existing faces, and derive potential characteristics (e.g., location, direction, carrier signal configuration) of new carrier signals for existing faces as well as new faces, to facilitate the creation of the intended overlap zones.

The following section discusses different types of transmission information that can be used to identify intra-site overlap zones 320A-B, as well as inter-site overlap zones that are discussed with FIG. 5 below. For example, for carrier signal 312C (e.g., similar in characteristics to an LTE or earlier generation macro signal), different combinations of transmission information can be collected via transmission information component 122, including, but not limited to the geographic location of the transmitting face 310A, the direction of transmitting face 310A, beam width 315 of the beam of carrier signal 312C, the elevation of face 310A, the frequency of carrier signal 312C, and the transmission power of carrier signal 312C. Based at least on transmission information such as the information notes above, the approximate signal propagation labeled for carrier signal 312C can be identified, e.g., by analyzer component 124.

In another example of predicted placement of signals by one or more embodiments, carrier signals 312A-B are depicted as having narrow beams (e.g., also termed 'pencil-beams'), and are similar to the carrier signals used by mmWave antenna arrays of a fifth generation (5G) network or other next generation network implementation. One having skill in the relevant art(s), given the disclosure herein, will appreciate that similar combinations of the transmission information noted above for carrier signal 312C can be used to predict the beams labeled as 312A-B in FIG. 3, albeit with the signals having a narrower beam width than carrier signal 312C.

In addition, in one or more embodiments, transmission information can include terrain and clutter information about the path of the analyzed carrier signal 312C, e.g., if carrier signal 312B is blocked by building clutter, carrier overlap zone 320A, as depicted might not exist. While this information about signal path characteristics can be used to determine the propagation of macro carrier signal 312C, because of the propagation characteristics of picocell carrier signals 312A-B, this information can have added significance in some circumstances. One having skill in the relevant art(s), given the description and suggestions herein, will appreciate additional combinations of transmission information that can be used to predict the beams depicted.

Once the propagation of carrier signals 312A-C is predicted by one or more embodiments, this propagation can be analyzed (e.g., by analyzer component 124) to identify carrier overlap zones 320A-B, e.g., zones where multiple signals are estimated to be overlapping and thus potentially available as carrier signals for carrier aggregation. As discussed below, a variety of different reasons can exist for why particular carrier overlap zones are not selected to be carrier aggregation zones. As described herein, the particular characteristics that combine to a zone being enabled as a carrier aggregation zone can be termed zone characteristics, e.g., identified by zone characteristic component 128. It should further be noted that, although many of the examples herein relate to narrow pencil-beams (e.g., carrier signals 312A-B) the descriptions and suggestions related to these examples are not limited to the particular configurations of these examples, and can be applied to configuration of carrier aggregation generally.

One having skill in the relevant art(s), given the description herein will appreciate different reasons (e.g., some examples described below) that a carrier overlap zone, such as carrier overlap zone 320A (e.g., an overlapping of carrier signals 312B-C) is not enabled at base station 180 to provide carrier aggregation of carrier signals 312B-C while a user equipment is in carrier overlap zone 320A, e.g., a user equipment is not enabled to increase bandwidth by connecting to carrier signals 312B-C. For example, some characteristics (e.g., signal strength, frequency band) of carrier signals 312B-C may not be able to be combined without excessive interference. In another example, a carrier network can determine, based on a customer base, that certain devices are not capable of aggregating carrier signals 312B-C, because of the respective types of these signals. In another example, the geographic area of carrier overlap zone 320A may not have enough predicted traffic to justify the resources overhead of the enabling, or another carrier overlap zone that covers an area similar to carrier overlap zone 320A may have better characteristics and or already be implemented.

To selectively enable some of the identified carrier overlap zones, in one or more embodiments, computer executable components 120 can also include instructions that, when executed by processor 160, can facilitate performance of operations defining zone characteristic component 128. As discussed further with FIGS. 5-6 below, zone characteristic component 128 can, in accordance with one or more embodiments, determine zone signal characteristic information representative of a zone signal characteristic associated with enabling the carrier aggregation by the network equipment.

In one or more embodiments, a zone signal characteristic (e.g., based on a configuration) can be particular characteristics that cause carrier overlap zone 320A to be enabled or not enabled as a carrier aggregation zone. For example, one having skill in the relevant art(s), given the description herein will appreciate that, in some circumstances, carrier overlap zone 320A can have certain factors militating for an aggregation zone to be established (e.g., the traffic of the area and predicted bandwidth improvement), but certain factors also militating against the enabling (e.g., antenna orientation, transmission strength). In one or more embodiments, when a factor militating against facilitating carrier organization is associated with a configuration setting, an adjusted configuration setting can be selected that can comply with the zone characteristics identified by zone characteristic component 128. Zone characteristics can also cause one carrier overlap zone to be prioritized above another for selection, e.g., as described above.

It should further be noted that a similar process can be used by one or more embodiments to adapt to updated transmission information during ongoing operation of the analyzed base stations, e.g., zone characteristic component 128 can identify a change in characteristics of a carrier aggregation zone and configuration component 126 can select and implement updated configuration parameters to adapt to the updated transmission information. For example, when one or more of situations including, but not limited to, carrier signal sources of carrier overlap zone change, requirements for the zone change (e.g., more traffic), additional resources are deployed in the area, e.g., another base station site is deployed, as discussed with FIG. 5 below.

Continuing this example, one or more embodiments can collect and analyze transmission information and zone characteristics to facilitate carrier overlap zone 320A remaining enabled for carrier aggregation in the carrier overlap zone. Thus, for example, in one or more embodiments, configuration component 126 can, based on the updated zone signal characteristic information collected by transmission information component 122, determine, based on analyzer component 124, updated transmission parameter information representative of an updated transmission parameter applicable to the transmission of the carrier signal 312B, e.g., to maintain the carrier aggregation by the network equipment.

Example sources of updated transmission information collected by transmission information component 122 include, but are not limited to, user equipment operating with carrier aggregation in the identified carrier aggregation zones. Returning to the example user equipment 170 of FIG. 2 above, in one or more embodiments, computer executable components 220 can further include instructions that, when executed by processor 160, can facilitate performance of operations defining, performance metric component 215 of user equipment 170. In accordance with one or more embodiments, performance metric component 215 can detect operating data about a performance of the aggregating of carrier signals 312B-C, e.g., carrier overlap zone 320A.

Once collected, performance metric component 215 can communicate the operating data to equipment for configuration (e.g., configuration component 126 of carrier aggregation equipment 150) to facilitate adjusting a characteristic associated with the aggregating of carrier signals 312B-C by the network equipment, e.g., to improve the configuration based on the zone characteristics identified by zone characteristics component or some other measure of performance.

Continuing the discussion of an example use of zone characteristics, in one or more embodiments, computer executable components 120 can also include instructions that, when executed by processor 160, can facilitate performance of operations defining zone confirmation component 127. As discussed with FIGS. 3, 5, and 6 below, zone confirmation component 127 can, in accordance with one or more embodiments, based on the carrier transmission information and the zone signal characteristic information, confirm that the first carrier overlap zone is capable of the enabling of the carrier aggregation by the network equipment.

Figure 4:
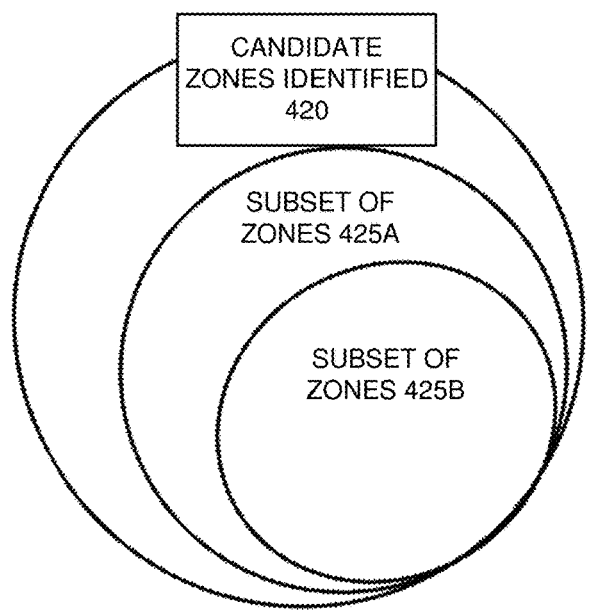
FIG. 4 is a diagram of a non-limiting example system that can facilitate configuring carrier aggregation zones based on transmission information, in accordance with one or more embodiments.

FIG. 4 is a diagram of a non-limiting example system 400 that can facilitate configuring carrier aggregation zones based on transmission information, in accordance with one or more embodiments. For purposes of brevity, description of like elements and/or processes employed in other embodiments is omitted.

In one or more embodiments, the analysis of identified carrier overlap zones 320A-B zones can be termed filtering the carrier overlap zone results to yield a subset of the carrier overlap zones for enabling as aggregation zones. Illustrating this example, FIG. 4 depicts a candidate zones 420 (e.g., candidates for enabling aggregation), with two filters being applied to generate subset of zones 425A as an interim value, and 425B that can be a set of zones capable and selected to be enabled for carrier aggregation.

Figure 5:
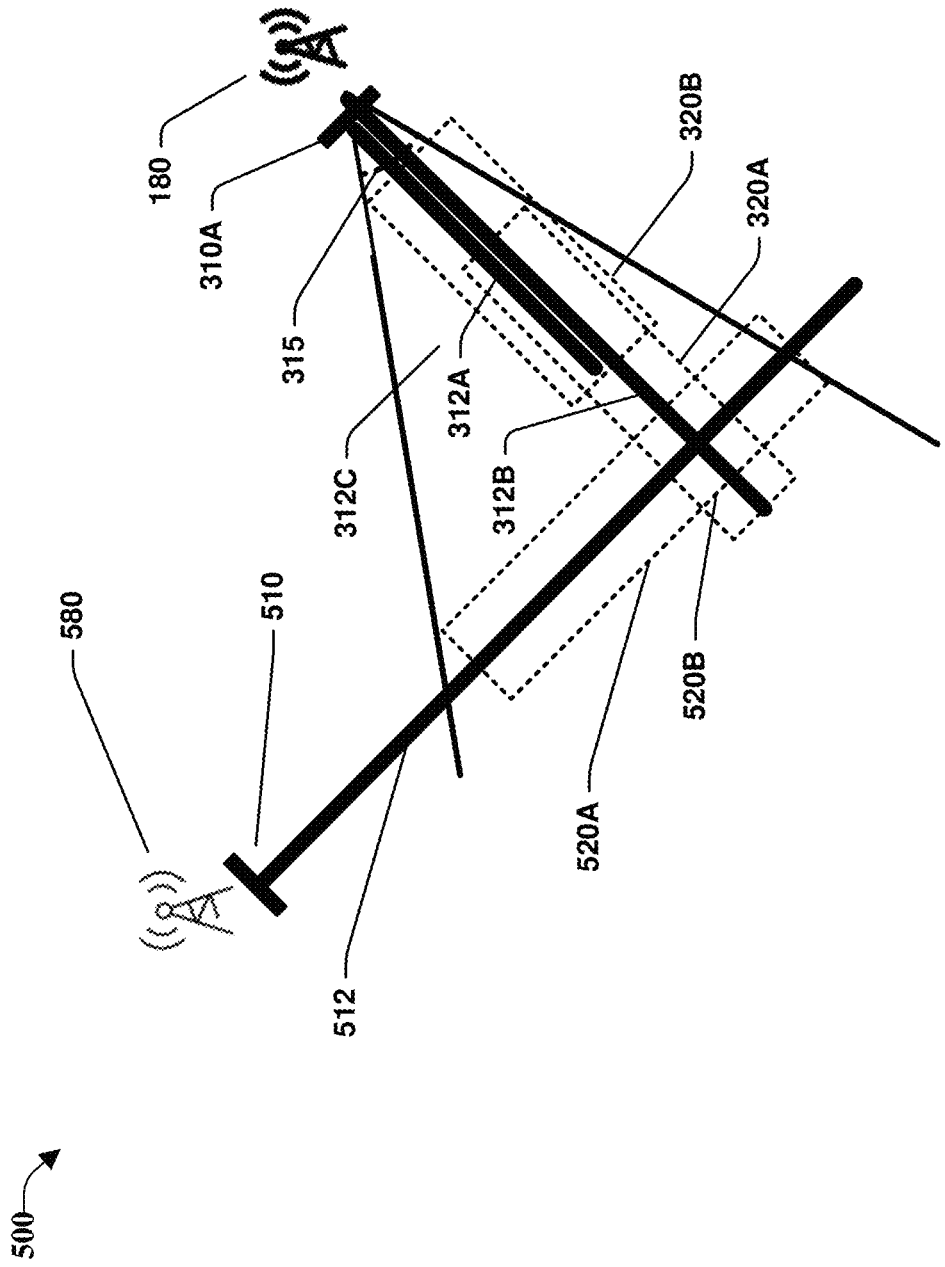
FIG. 5 is a diagram of a non-limiting example system that can facilitate configuring carrier aggregation zones based on transmission information, in accordance with one or more embodiments.

FIG. 5 is a diagram of a non-limiting example system 500 that can facilitate configuring carrier aggregation zones based on transmission information, in accordance with one or more embodiments. For purposes of brevity, description of like elements and/or processes employed in other embodiments is omitted.

As depicted, system 500 includes base stations 180 and 580 with base station 180 having face 310A and base station 580 having face 510. Face 310A is depicted as a source of carrier signals 312A-B, and face 510 is depicted being the source of carrier signal 512. Based on the carrier signals 312A-C and 512, overlap zones 320A-B and 520A-B are identified.

As discussed with FIG. 3 above, one or more embodiments can analyze transmission information of multiple carrier signals to identify carrier overlap zones 310A-B. While FIG. 3, depicting carrier signal beams of base station 180, describes potential intra-site carrier aggregation, FIG. 5, depicting beams of both base station 180 and base station 580, describes identification, analysis, selection, and enablement of inter-site carrier aggregation zones from carrier overlap zones 310A-B and 520A-B.

One having skill in the relevant art(s), given the description herein, would appreciate that additional types of transmission information can have increased relevance, when evaluating inter-site carrier overlap zones. For example, while the latency of carrier signals 312A-C can be considered, but may not be significant with the analysis of FIG. 3, the compared latency of carrier signals 512 and 312A could be significant, depending on factors that include distance of base station 580 from carrier overlap zones 520A-B, as well as the frequency and band of carrier signal 512. An example zone characteristic that can be set for inter-site carrier overlap zones to be eligible for use for carrier aggregation is the estimated round-trip minimum time of signals, e.g., a 10 ms minimum round trip being required. Another example characteristic that can be evaluated incudes characteristics of the connection between the inter-site signal components, e.g., the latency of the connection between base stations 180 and 580.

Continuing with this example zone characteristic, and returning to an example discussed with FIG. 2 above, signal round trip minimum time is an example of a metric that can be estimated based on transmission information, then evaluated based on the operation of carrier aggregation by user equipment 170 in carrier overlap zones 520A-B. Thus, performance metric component 215 of user equipment 170 can, in accordance with one or more embodiments, detect operating data about the performance of carrier aggregation in carrier overlap zones 520A-B (e.g., minimum round-trip time of aggregated carrier signal 512), and this transmission information can be provided to configuration component 126 of carrier aggregation equipment 150, e.g., for evaluation and reconfiguration/disabling of carrier aggregation in overlap zones 520A-B or other zones, depending on the data.

In a variation of this example, in some implementations, as noted with the discussion of FIG. 3 above, the evaluation of transmission information and required zone characteristics for multiple zones can be used to prioritize respective carrier overlap zones for carrier aggregation configuration and use. For example, in one or more embodiments, performance metric component 215 can communicate collected operating data from carrier overlap zones 320A-B to configuration component 126 for evaluation and real-time prioritization of these zones for use.

Figure 6:
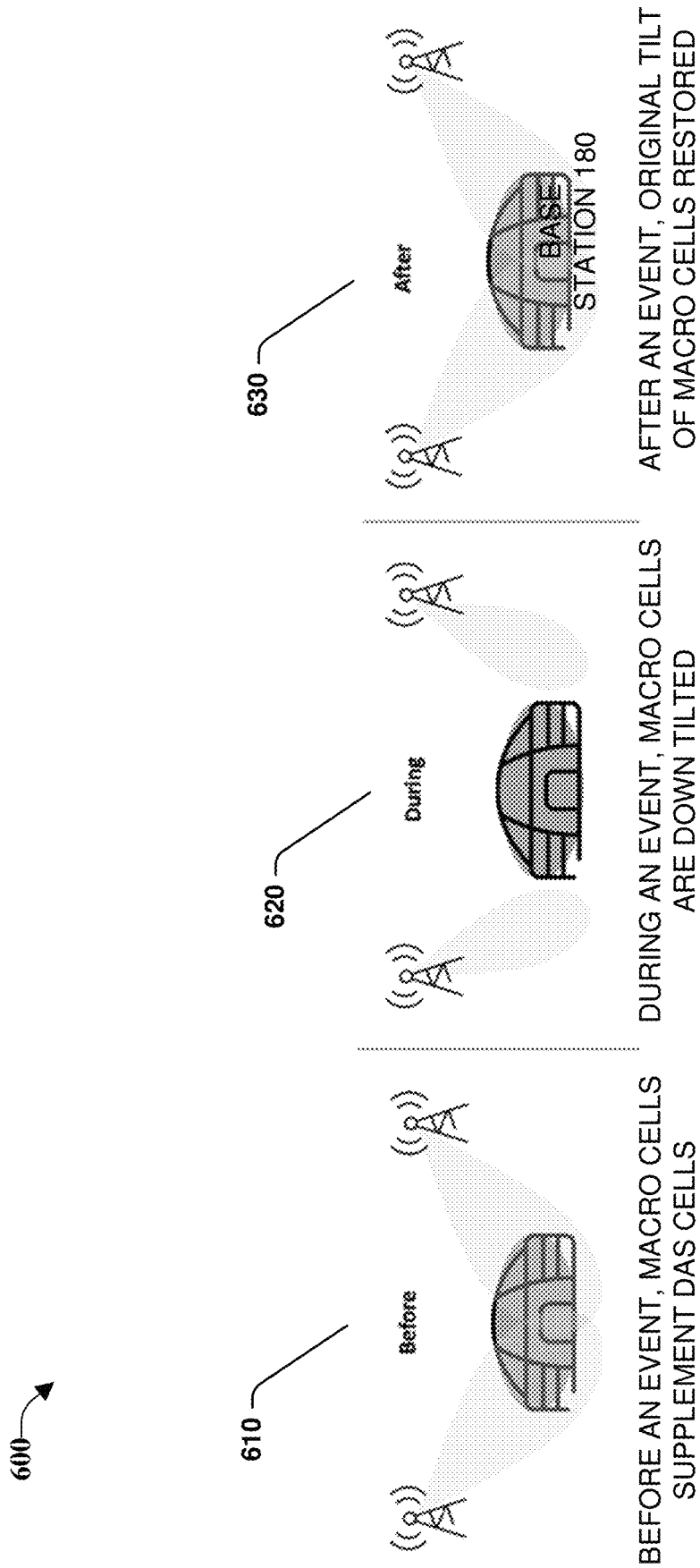
FIG. 6 is a diagram of a non-limiting example system that can facilitate event-triggered control of the direction of a transmission face, in accordance with one or more embodiments.
Figure 7:
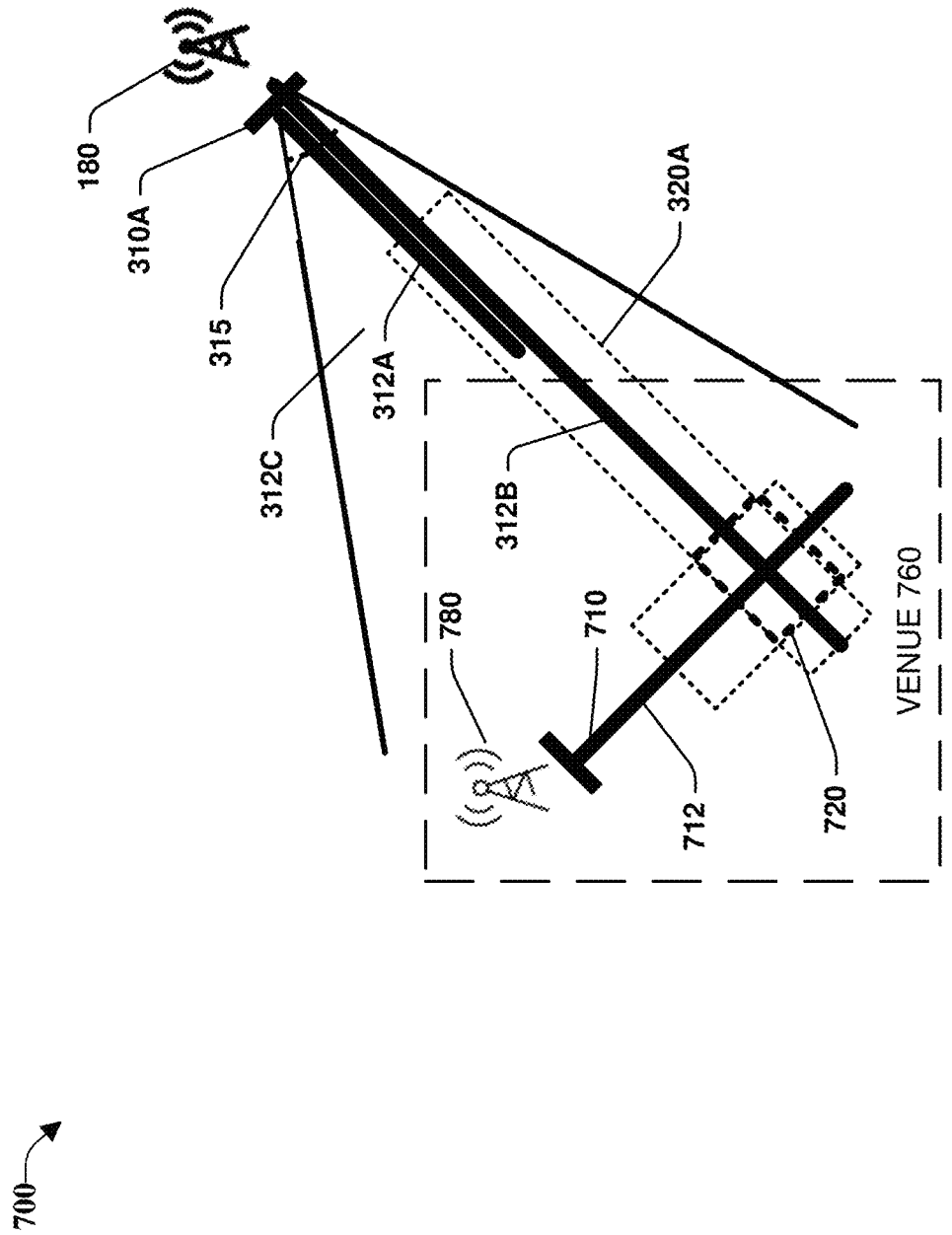
FIG. 7 is a diagram of a non-limiting example system that can facilitate event-triggered control of the direction of a transmission face, in accordance with one or more embodiments.
Figure 8:
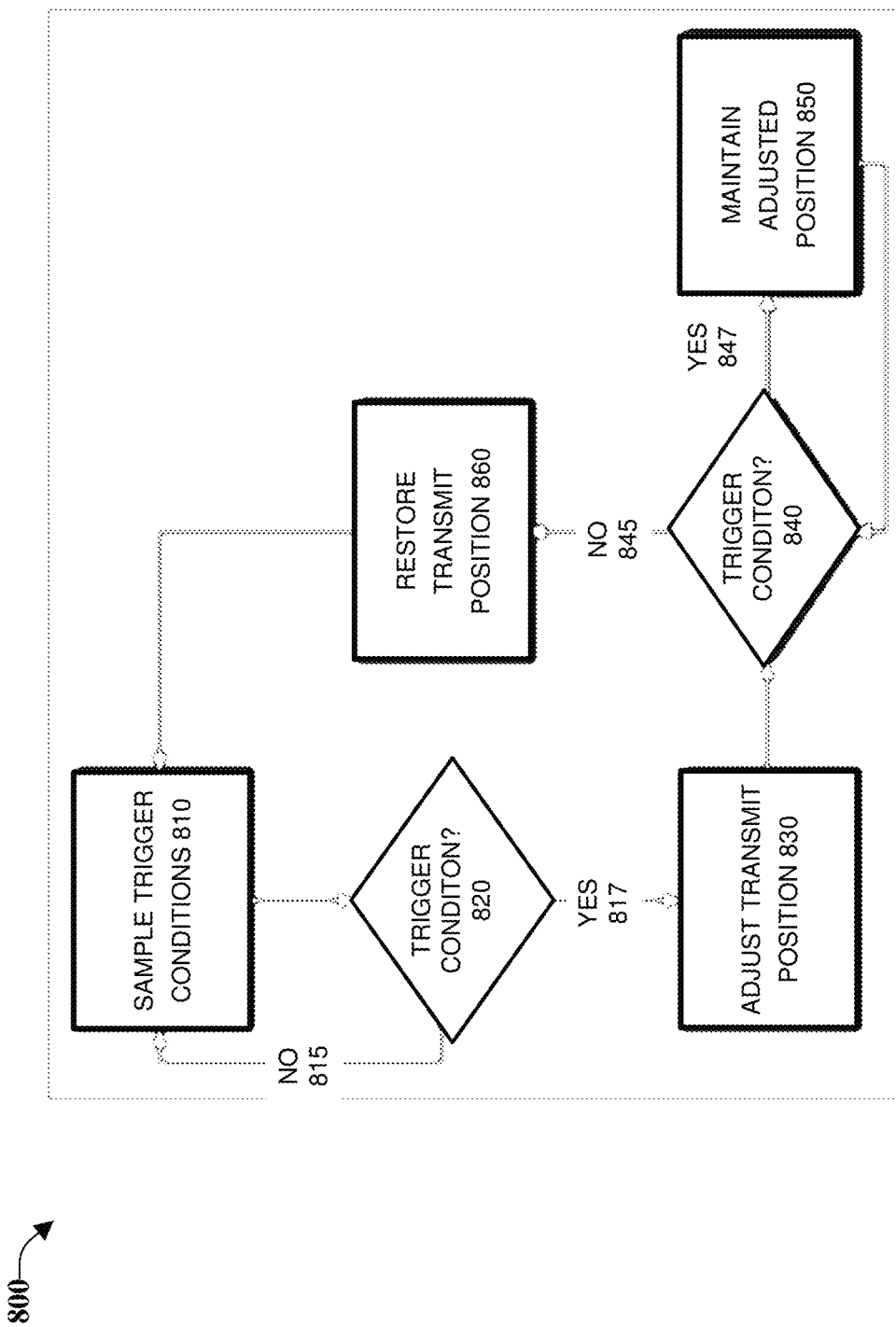
FIG. 8 is a diagram of a non-limiting example flowchart of a system that can facilitate event-triggered control of the direction of a transmission face, in accordance with one or more embodiments.

The following section discusses two additional sets of embodiments that can utilize the carrier overlap zone analysis discussed above, as well as other approaches. In FIGS. 6-8, in accordance with one or more embodiments, event-triggered control of the direction of a transmission face can be enabled for certain transmission resources, for certain events, and in FIG. 9, in accordance with one or more embodiments, related sets of transmission sources can be identified, and different configuration settings can be implemented for the related sets.

FIG. 6 is a diagram of a non-limiting example system 600 that can facilitate event-triggered control of the direction of a transmission face, in accordance with one or more embodiments. For purposes of brevity, description of like elements and/or processes employed in other embodiments is omitted. As depicted, system 600 includes examples 610A-C, corresponding to a venue and macro cell antennas before an event at the venue, during the event at the venue, and after the event at the venue, respectively.

In this section, in an example generally depicted in FIG. 6, a venue can have wireless service provided sets of antennas configured to serve the venue. In this example, the venue can be a location that periodically undergoes large changes in traffic demand, e.g., a sports stadium venue that hosts games once a week for one season a year. To satisfy the periodic surges in demand, the sets of antennas deployed in such a location can be significant (e.g., configured distributed antenna systems), while normal outdoor wireless connectivity is maintained, e.g., by longer-range macro base stations and potentially by narrow-beam picocell resources. Thus, in example 610 of FIG. 6, two macro base stations transmit signals into a venue, as well as in other directions (not depicted).

One or more embodiments can solve a problem recognized to occur in some circumstances described above during an event at the venue, namely when the customized distributed antenna systems deployed at the venue are under a heavy load, the signals transmitted by the external macro cells can degrade performance of the customized systems, e.g., by interference. In example 620, an approach used to address these problems is depicted, e.g., during an event at the venue, as discussed in more detail with FIG. 7-8 below, the direction of the faces that transmit the macro signals are altered so as to avoid entering the venue and causing interference. In example 630, after the event ends the macro antennas can be changed back to an orientation where entering the venue is not as problematic.

FIG. 7 is a diagram of a non-limiting example system 700 that can facilitate event-triggered control of the direction of a transmission face, in accordance with one or more embodiments. As depicted, system 700 includes base stations 180 and 780 with base station 180 having face 310A and base station 580 having face 710. Face 310A is depicted as a source of carrier signals 312A-B, and face 710 is depicted being the source of carrier signal 712. Based on the carrier signals 312A-C and 712, venue interference zones 320A and 720 are identified. In this example, base station 780 is a resource that can be customized for handling the traffic of venue 760, e.g., during periodic events.

It should be noted that venue interference zones 320A and 720 can correspond to the carrier overlap zones 320A-B and 520A-B discussed with FIG. 5 above. One having skill in the relevant art(s), given the description herein, would appreciate that the transmission information described above can be analyzed by analyzer component 124, not for carrier overlap zones to facilitate carrier aggregation, but for carrier overlap zones that can be indicative of signal interference. Thus, based on one or more embodiments, by identifying geographic locations with carrier overlap zones that periodically vary, not only can larger venues such as sports stadiums be handled by embodiments, but smaller venues can also be identified and evaluated for use with this approach.

Returning to FIG. 7, when one or more embodiments determine that interference-mitigating operations are warranted, the signals that are identified as overlapping base station 780 can be selected for mitigation. In this example, carrier signals 312B-C are identified as signals to be mitigated, e.g., based on carrier overlap zone 720 identified in venue 760 in accordance with the analysis described with FIGS. 3 and 5 above. In an exemplary, non-limiting approach to mitigation, the elevation (e.g., tilt) of the transmitting antenna can be redirected down, e.g., to reduce the signal causing interference in venue 760. One having skill in the relevant art(s), given the description herein will appreciate that adjusting the tilt is only one approach to altering the configuration of the transmission of carrier signals 312B-C so as to mitigate interference within venue 760. The determination of interference-mitigating operations being warranted is discussed with FIG. 8 below.

FIG. 8 is a diagram of a non-limiting example flowchart of a system 800 that can facilitate event-triggered control of the direction of a transmission face, in accordance with one or more embodiments.

System 800 begins with a sampling of trigger conditions 810 inside of venue 760, with a test 820 of whether the trigger conditions have been detected. Example combinations and samples of trigger conditions are listed below, including, but not limited to, downlink throughput per user equipment (e.g., UE DL less than 100 kbs), peak users connected (e.g., PEAK RRC_CONNECTED greater than 75), physical resource block utilization (e.g., PRB utilization greater than 60), control channel utilization (PDCCH utilization greater than 20), and an average number of connected users (e.g., average RRC greater than 300).

At 830, based on the condition being satisfied 817, the transmit position of identified carrier signals, can be adjusted, e.g., the antennas for carrier signals 312B-C can be tilted down to a degree selected by one or more embodiments to remove overlap zone 720 and the interference with base station 780. At 840 and 850, the trigger condition is monitored and the change in transmit position is maintained until the trigger condition is not determined to be present, when at 860, the antenna is adjusted back to its original transmit position.

It should be noted that, in addition to the binary approach depicted in FIG. 8, in additional embodiments, the adjustment of the antenna in response to the trigger position can be phased over time, e.g., because adjusting the position of antennas can have overhead and performance costs, the adjustments can be phased in increments, based on the value of trigger conditions, the presence of trigger conditions over a time period, and other similar approaches.

Figure 9:
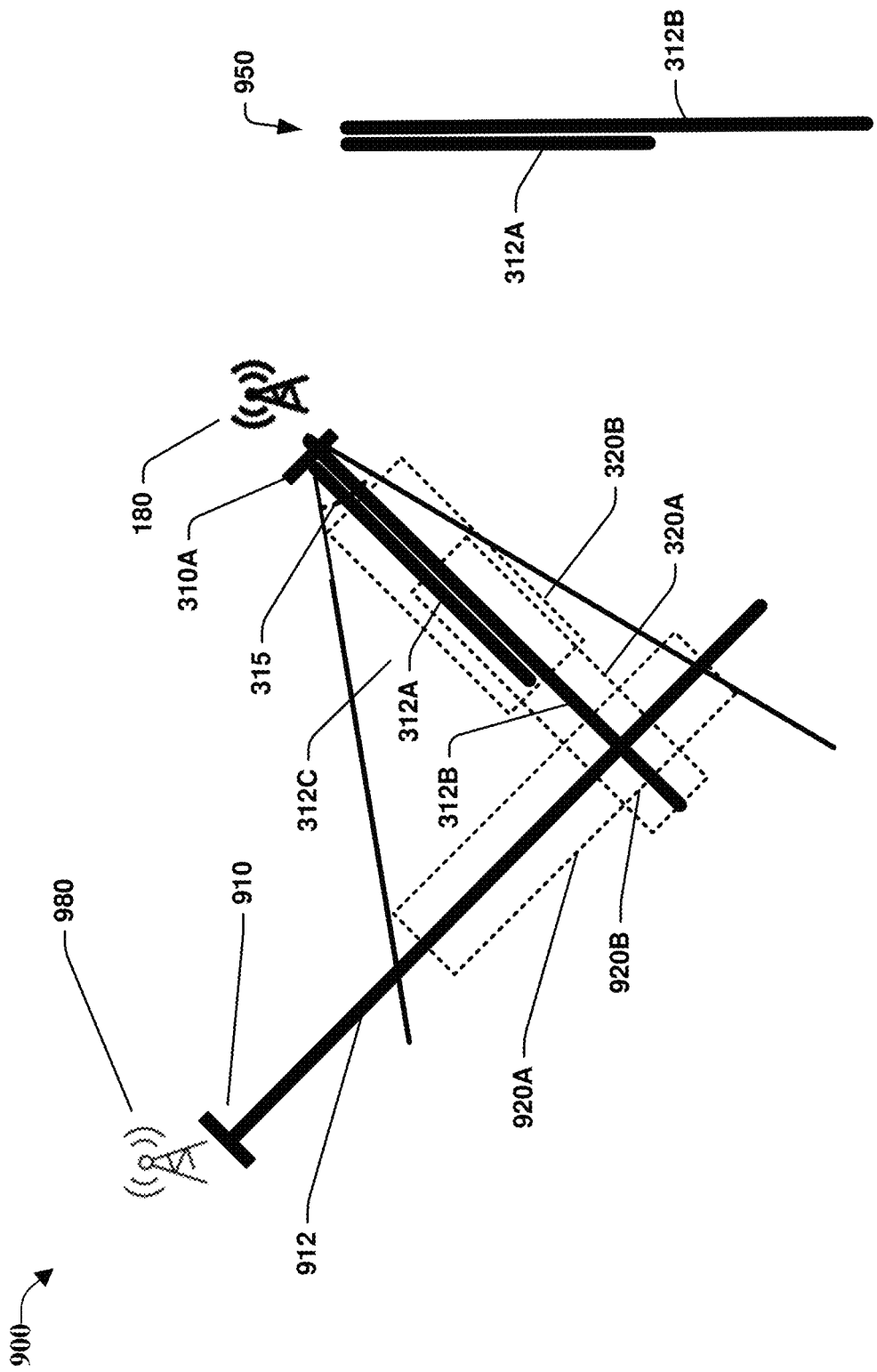
FIG. 9 is a diagram of a non-limiting example system that can facilitate selecting sets of related signals for application of coordinated parameters, in accordance with one or more embodiments.

FIG. 9 is a diagram of a non-limiting example system 900 that can facilitate selecting sets of related signals for application of coordinated parameters, in accordance with one or more embodiments. As depicted, system 900 includes base stations 180 and 980 with base station 180 having face 310A and base station 980 having face 910. Face 310A is depicted as a source of carrier signals 312A-B, and face 910 is depicted being the source of carrier signal 912. Based on analysis of the propagation of carrier signals 312A-B and other transmission information, carrier signals can be identified as a related pair 950 of signals, e.g., for application of coordinated parameter settings described below.

One having skill in the relevant art(s), given the description herein, would appreciate that the transmission information described above can be analyzed by analyzer component 124, not for carrier overlap zones to facilitate carrier aggregation (e.g., FIG. 3) or interference (e.g., FIG. 7), but for carrier overlap zones 320A-B and 920A-B that can be indicative of related pairs of signals. It should be noted that, in exemplary embodiments described herein, the selection of related pairs of signals are described, but this number is non-limiting, with embodiments described herein applying to other sets of signals.

In one or more embodiments, automatically identifying related signals can facilitate the rapid configuration of different settings for which coordinated parameter settings can be used. Example coordinated parameter settings for pairs of signal transmissions include, but are not limited to, load balancing, handover mobility between the pair, priority service allocation for the pair, and other similar settings.

In an example that can illustrate a variety of different applications of embodiments, the analysis of transmission information described with FIGS. 3 and 5 can be applied to selecting a pair 950 of carrier signals 312A-B for load balancing. Selection criteria to benefit this function can be applied in the analysis, e.g., signal similarity (e.g., both carrier signals 312A-B originate from face 310A), an overlapping of the signals (e.g., both carrier signals 312A-B overlap within carrier overlap zone 320B), and other criteria that would be appreciated by one having skill in the relevant art(s), given the description herein.

Figure 10:
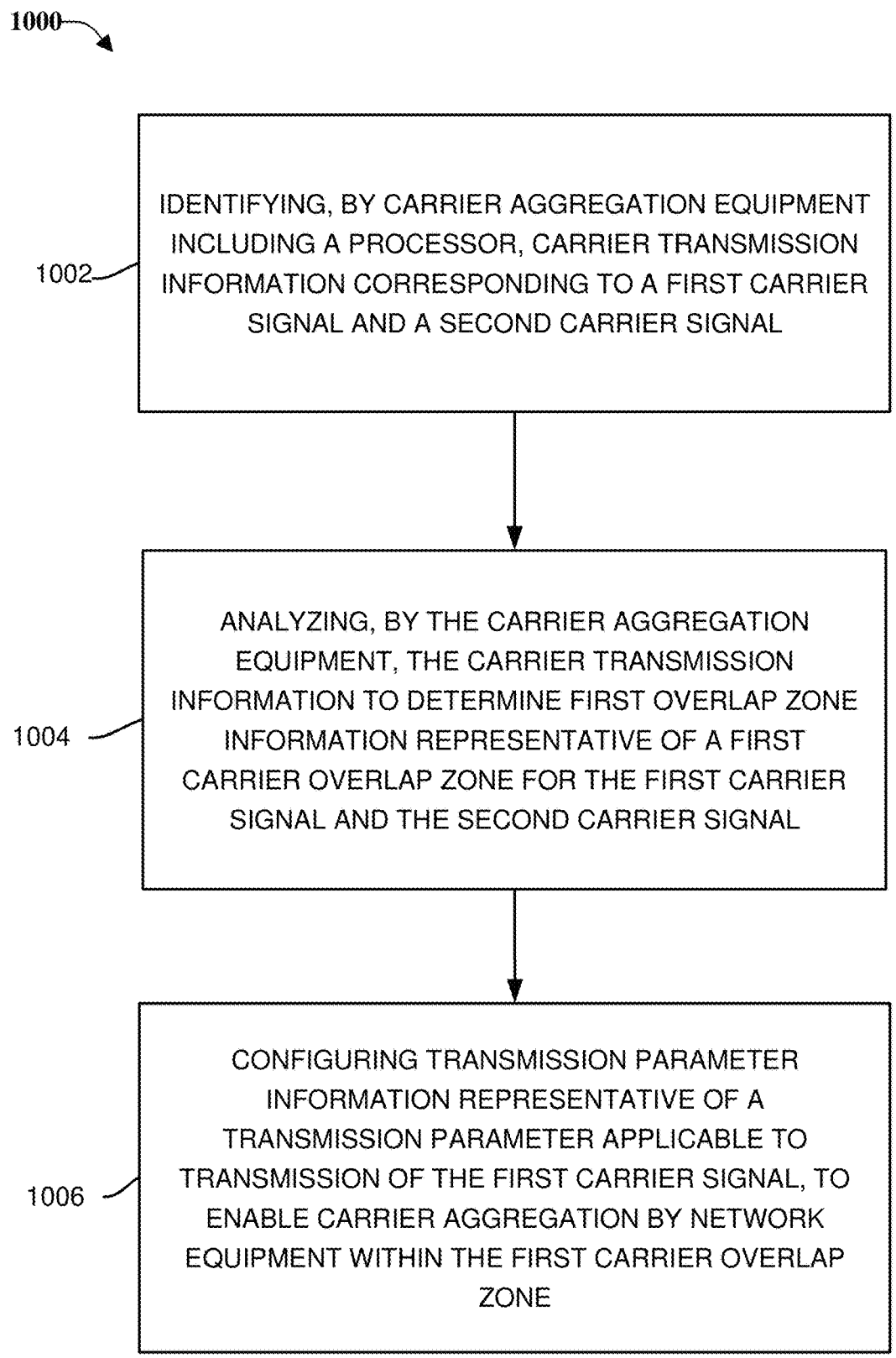
FIG. 10 illustrates an example method that can facilitate configuring carrier aggregation zones based on transmission information, in accordance with one or more embodiments.

FIG. 10 illustrates an example method 1000 that can facilitate configuring carrier aggregation zones based on transmission information, in accordance with one or more embodiments. For purposes of brevity, description of like elements and/or processes employed in other embodiments is omitted.

At 1002, method 1000 can include identifying, by carrier aggregation equipment comprising a processor, carrier transmission information corresponding to a first carrier signal and a second carrier signal. At 1004, method 1000 can include analyzing, by the carrier aggregation equipment, the carrier transmission information to determine first overlap zone information representative of a first carrier overlap zone for the first carrier signal and the second carrier signal. At 1006, method 1000 can include, based on the first overlap zone information, facilitating, by the carrier aggregation equipment, configuring transmission parameter information, representative of a transmission parameter applicable to transmission of the first carrier signal, to enable carrier aggregation by network equipment within the first carrier overlap zone.

Figure 11:
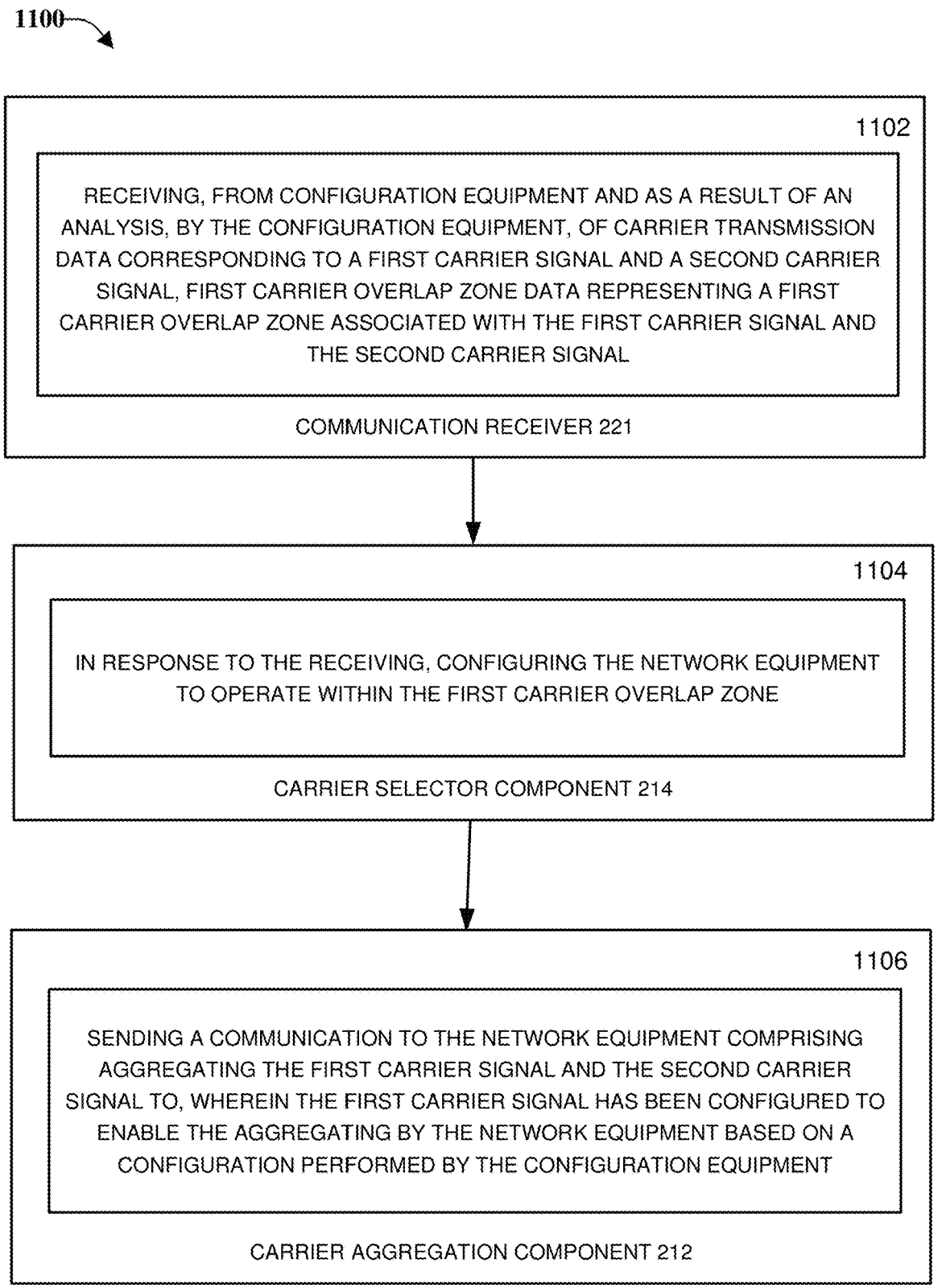
FIG. 11 depicts a system where one or more functions of user equipment 170 described above can be implemented, in accordance with one or more embodiments described above.

FIG. 11 depicts a system 1100 where one or more functions of user equipment 170 described above can be implemented, in accordance with one or more embodiments described above. For purposes of brevity, description of like elements and/or processes employed in other embodiments is omitted.

In one or more embodiments, user equipment 170 can be implemented in a software platform that includes several interconnected components. As depicted, system 1100 includes communication receiver 221, carrier selector component 214, carrier aggregation component 212, and other components described or suggested by different embodiments described herein.

In an example, component 1102 can include the functions of communication receiver 221, supported by the other layers of system 1100. For example, component 1102 can receive, from configuration equipment and as a result of an analysis, by the configuration equipment, of carrier transmission data corresponding to a first carrier signal and a second carrier signal, first carrier overlap zone data representing a first carrier overlap zone associated with the first carrier signal and the second carrier signal. In an example, component 1104 can include the functions of carrier selector component 214, supported by the other layers of system 1100. For example, component 1104 can in response to the receiving, configuring the network equipment to operate within the first carrier overlap zone.

In an example, component 1106 can include the functions of carrier aggregation component 212, supported by the other layers of system 1100. For example, component 1106 can send a communication to the network equipment comprising aggregating the first carrier signal and the second carrier signal to, with the first carrier signal being configured to enable the aggregating by the network equipment based on a configuration performed by the configuration equipment.

Figure 12:
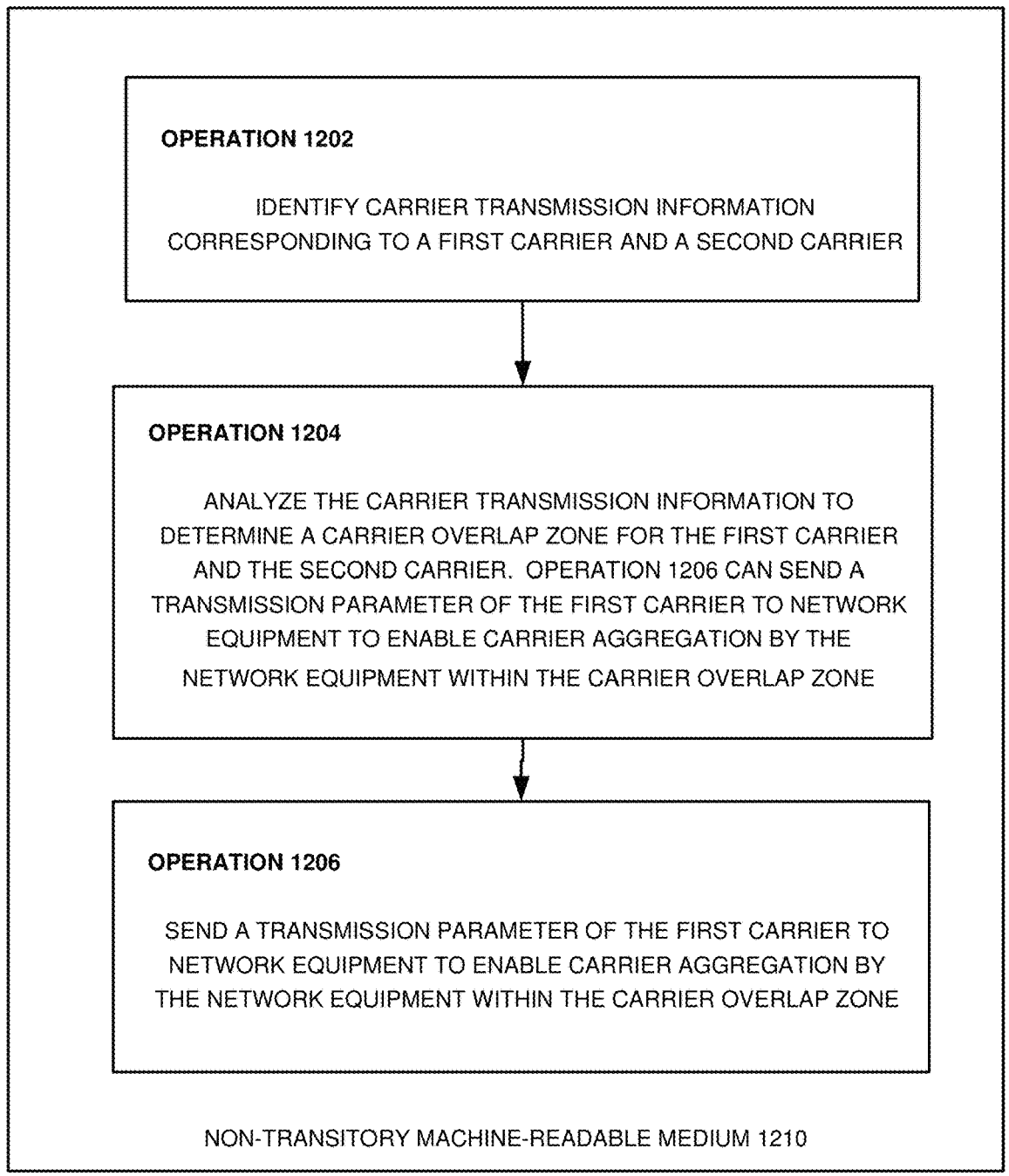
FIG. 12 depicts an example non-transitory machine-readable medium that can include executable instructions that, when executed by a processor of a system, facilitate enabling carrier aggregation in a carrier signal overlap zone, in accordance with one or more embodiments described above.

FIG. 12 depicts an example 1200 non-transitory machine-readable medium 1210 that can include executable instructions that, when executed by a processor of a system, facilitate enabling carrier aggregation in a carrier signal overlap zone, in accordance with one or more embodiments described above. For purposes of brevity, description of like elements and/or processes employed in other embodiments is omitted. As depicted, non-transitory machine-readable medium 1210 includes executable instructions that can facilitate performance of operations 1202-1206.

In one or more embodiments, the operations can include operation 1202 that can identify carrier transmission information corresponding to a first carrier and a second carrier. Operation 1204 can analyze the carrier transmission information to determine a carrier overlap zone for the first carrier and the second carrier. Operation 1206 can send a transmission parameter of the first carrier to network equipment to enable carrier aggregation by the network equipment within the carrier overlap zone.

Figure 13:
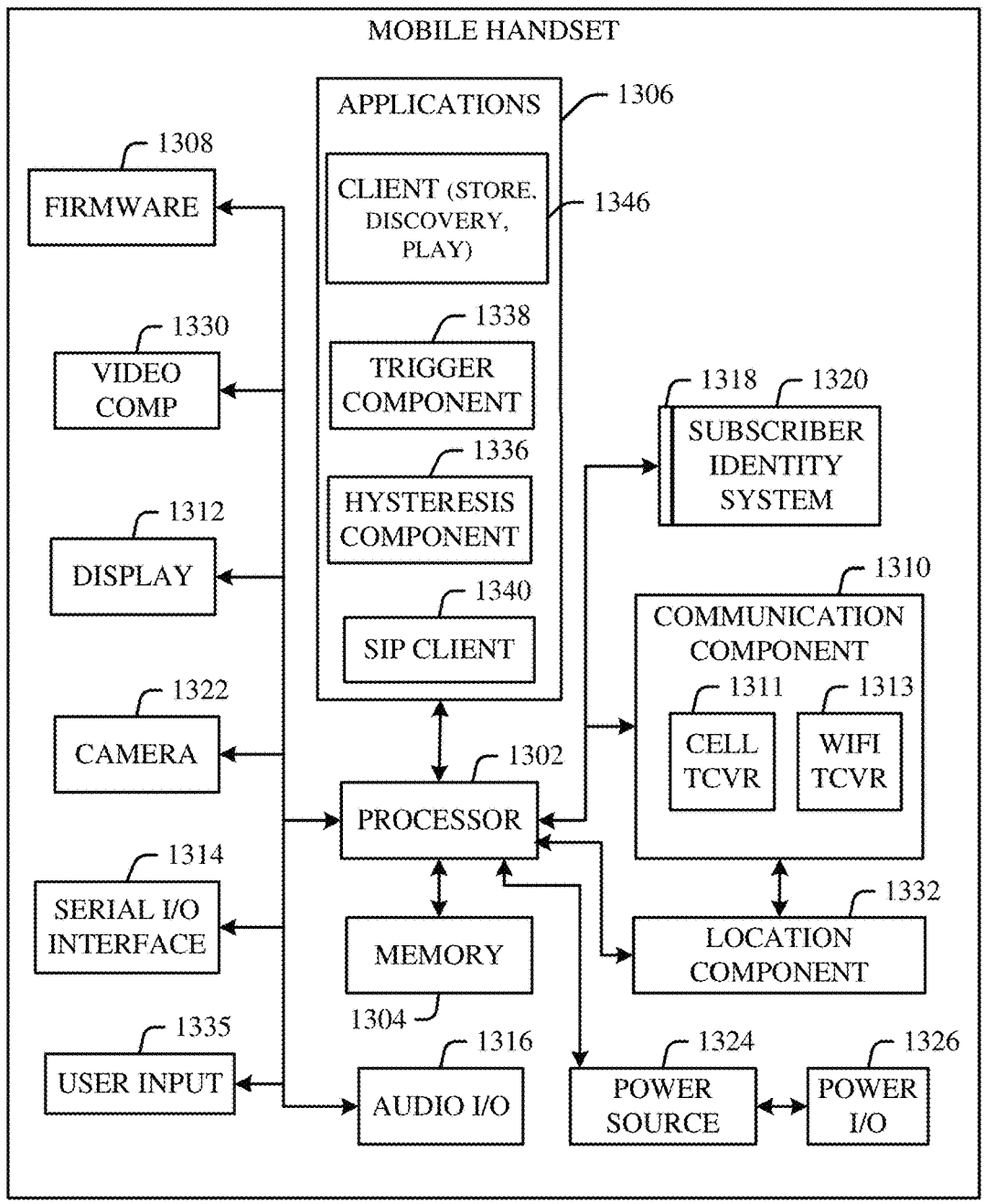
FIG. 13 illustrates an example block diagram of an example mobile handset operable to engage in a system architecture that can facilitate processes described herein, in accordance with one or more embodiments.

FIG. 13 illustrates an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1313 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1294) through a hard-wire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-Spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 14:
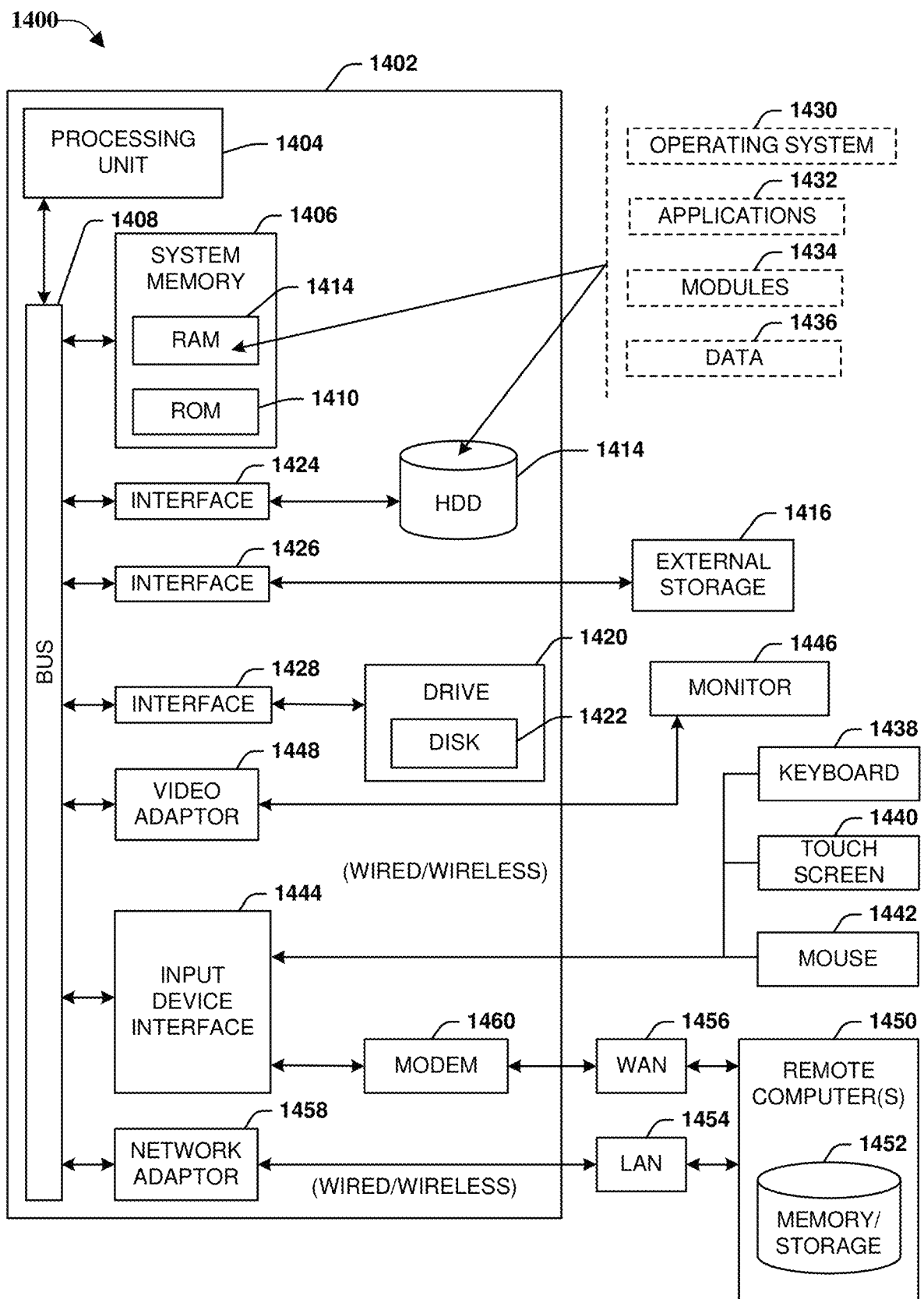
FIG. 14 illustrates an example block diagram of an example computer operable to engage in a system architecture that can facilitate processes described herein, in accordance with one or more embodiments.

FIG. 14 provides additional context for various embodiments described herein, intended to provide a brief, general description of a suitable operating environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

FIG. 14 depicts an example operating environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1414 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and a drive 1420, e.g., such as a solid state drive, an optical disk drive, which can read or write from a disk 1422, such as a CD-ROM disc, a DVD, a BD, etc. Alternatively, where a solid state drive is involved, disk 1422 would not be included, unless separate. While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and drive 1420 can be connected to the system bus 1408 by an HDD interface 1424, an external storage interface 1426 and a drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above, such as but not limited to a network virtual machine providing one or more aspects of storage or processing of information. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE) or 5G; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
    identifying, by carrier aggregation equipment comprising a processor, carrier transmission information corresponding to a first carrier signal and a second carrier signal;
    analyzing, by the carrier aggregation equipment, the carrier transmission information to determine first overlap zone information representative of a first carrier overlap zone for the first carrier signal and the second carrier signal;
    based on the first overlap zone information, facilitating, by the carrier aggregation equipment, configuring transmission parameter information, representative of a transmission parameter applicable to transmission of the first carrier signal, to enable carrier aggregation by network equipment within the first carrier overlap zone;
    receiving, by the carrier aggregation equipment, first operating information from the network equipment based on operation of the network equipment with respect to the first carrier overlap zone; and
    based on the first operating information, determining, by the carrier aggregation equipment, updated transmission parameter information representative of an updated transmission parameter applicable to the transmission of the first carrier signal to adjust a characteristic of the carrier aggregation within the first carrier overlap zone.

2. The method of claim 1, wherein the carrier transmission information comprises configuration parameter information, representative of a configuration parameter for base station equipment that originates the first carrier signal.

3. The method of claim 1, wherein the carrier transmission information comprises antenna direction information representative of a direction applicable to an orientation of an antenna for the transmission of the first carrier signal.

4. The method of claim 1, wherein the carrier transmission information comprises signal characteristic information representative of a signal characteristic of the first carrier signal.

5. The method of claim 1, further comprising:
    determining, by the carrier aggregation equipment, zone signal characteristic information representative of a zone signal characteristic associated with enabling the carrier aggregation by the network equipment; and
    based on the carrier transmission information and the zone signal characteristic information, confirming, by the carrier aggregation equipment, that the first carrier overlap zone is capable of the enabling of the carrier aggregation by the network equipment.

6. The method of claim 5, further comprising, based on the zone signal characteristic information, enabling, by the carrier aggregation equipment using the transmission parameter information, the first carrier overlap zone to be capable of performing the carrier aggregation.

7. The method of claim 5, further comprising,
    determining, by the carrier aggregation equipment, updated zone signal characteristic information representative of an updated zone signal characteristic associated with the enabling of the carrier aggregation; and
    based on the updated zone signal characteristic information, determining, by the carrier aggregation equipment, updated transmission parameter information representative of an updated transmission parameter applicable to the transmission of the first carrier signal to maintain the carrier aggregation by the network equipment.

8. The method of claim 1, wherein the first carrier signal and the second carrier signal originate from different base station equipment.

9. The method of claim 1, further comprising;
    receiving, by the carrier aggregation equipment, updated carrier transmission information for the first carrier signal that updates the carrier transmission information; and
    based on the updated carrier transmission information, determining, by the carrier aggregation equipment, updated transmission parameter information representative of an updated transmission parameter applicable to the transmission of the first carrier signal to maintain the carrier aggregation by the network equipment.

10. The method of claim 1, wherein the carrier transmission information comprises a first configuration parameter for first base station equipment that originates the first carrier, wherein the carrier transmission information comprises a second configuration parameter for second base station equipment that originates the second carrier signal, and wherein the first base station equipment and the second base station equipment are different base station equipment.

11. The method of claim 1, further comprising:
    based on analysis of additional carrier transmission information other than the carrier transmission information, identifying, by the carrier aggregation equipment, second overlap zone information representative of a second carrier overlap zone; and
    receiving, by the carrier aggregation equipment, second operating information from the network equipment based on operation of the network equipment with respect to the first carrier overlap zone and the second carrier overlap zone; and
    based on the second operating information, facilitating, by the carrier aggregation equipment, prioritization of use, by the network equipment, of the first carrier overlap zone over the second carrier overlap zone.

12. Network equipment, comprising:
    a processor; and
    a memory that stores executable instructions that, when executed by the processor, facilitate performance of operations, comprising:
        receiving, from configuration equipment and as a result of an analysis, by the configuration equipment, of carrier transmission data corresponding to a first carrier signal and a second carrier signal, first carrier overlap zone data representing a first carrier overlap zone associated with the first carrier signal and the second carrier signal;

in response to the receiving, configuring the network equipment to operate within the first carrier overlap zone;

sending a communication comprising aggregating the first carrier signal and the second carrier signal, wherein the first carrier signal has been configured to enable the aggregating by the network equipment based on a configuration performed by the configuration equipment;

detecting operating data about a performance of the aggregating of the first carrier signal and the second carrier signal; and communicating the operating data to the configuration equipment to facilitate adjusting, by the configuration equipment, transmission parameter data representing a transmission parameter of the first carrier signal to adjust a characteristic associated with the aggregating by the network equipment.

13. The network equipment of claim 12, wherein the carrier transmission data comprises a first configuration parameter for first base station equipment that originates the first carrier, wherein the carrier transmission data comprises a second configuration parameter for second base station equipment that originates the second carrier signal, and wherein the first base station equipment and the second base station equipment are different base station equipment.

14. The network equipment of claim 12, wherein the operations further comprise:

detecting operating data about respective performances in the first carrier overlap zone and a second carrier overlap zone; and communicating the operating data to the configuration equipment to facilitate prioritizing, by the configuration equipment, the first carrier overlap zone over the second carrier overlap zone.

15. The network equipment of claim 12, wherein the first carrier signal and the second carrier signal originate from different base stations.

16. The network equipment of claim 12, wherein the carrier transmission data comprises signal transmission configuration parameters data representing a signal transmission configuration parameter for a base station to use for origination of the first carrier signal.

17. A non-transitory machine-readable medium, comprising executable instructions that, when executed by a processor of a system, facilitate performance of operations, comprising:

identifying carrier transmission information corresponding to a first carrier and a second carrier;

analyzing the carrier transmission information to determine a carrier overlap zone for the first carrier and the second carrier;

sending a transmission parameter of the first carrier to network equipment to enable carrier aggregation by the network equipment within the carrier overlap zone;

receiving first operating information from the network equipment based on operation of the network equipment with respect to the first carrier overlap zone; and based on the first operating information, determining updated transmission parameter information representative of an updated transmission parameter applicable to transmission of the first carrier to adjust a characteristic of the carrier aggregation within the first carrier overlap zone.

18. The non-transitory machine-readable medium of claim 17, wherein the carrier transmission information comprises a first configuration parameter for first base station equipment that originates the first carrier.

19. The non-transitory machine-readable medium of claim 18, wherein the carrier transmission information comprises a second configuration parameter for second base station equipment that originates the second carrier, and wherein the first base station equipment and the second base station equipment are different base station equipment.

20. The non-transitory machine-readable medium of claim 17, wherein the carrier transmission information comprises a signal characteristic of the first carrier.

* * * * *